(12) United States Patent
Wu

(10) Patent No.: US 9,303,740 B2
(45) Date of Patent: Apr. 5, 2016

(54) LINEAR ACTUATOR WITH SPEED-ADJUSTABLE QUICK RELEASE MECHANISM

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 305 days.

(21) Appl. No.: 13/940,400

(22) Filed: Jul. 12, 2013

(65) Prior Publication Data

US 2014/0338480 A1   Nov. 20, 2014

(30) Foreign Application Priority Data

May 15, 2013 (TW) .............................. 102117192 A

(51) Int. Cl.
| | |
|---|---|
| *F16H 25/20* | (2006.01) |
| *F16H 25/24* | (2006.01) |
| *A61G 7/018* | (2006.01) |

(52) U.S. Cl.
CPC ............ *F16H 25/20* (2013.01); *F16H 25/2454* (2013.01); *A61G 7/018* (2013.01); *F16H 2025/209* (2013.01); *F16H 2025/2084* (2013.01); *Y10T 74/18576* (2015.01)

(58) Field of Classification Search
CPC ............... F16H 25/2454; F16H 25/20; F16H 2025/209; F16H 2025/2065; F16H 2025/2068; F16H 25/2463; F16H 2025/2071; A61G 7/018
USPC .................. 74/89.26, 89.38, 89.39, 89.23
See application file for complete search history.

(56) References Cited

U.S. PATENT DOCUMENTS

| | | | | | |
|---|---|---|---|---|---|
| 4,301,897 | A | * | 11/1981 | Cox, Jr. .................... | F16D 65/56 188/196 BA |
| 5,174,662 | A | * | 12/1992 | Harvey .................. | F15B 15/264 384/517 |
| 8,091,444 | B2 | * | 1/2012 | Tseng .................. | F16H 25/2454 188/180 |
| 8,210,064 | B2 | * | 7/2012 | Ku ............................ | B66F 3/08 74/89.38 |
| 8,291,782 | B1 | * | 10/2012 | Shaheen .................. | B64C 13/28 74/89.23 |
| 8,616,080 | B2 | * | 12/2013 | Flatt ........................ | B64C 13/50 244/99.2 |
| 2004/0093969 | A1 | * | 5/2004 | Nielsen ................ | A47C 20/041 74/89.23 |
| 2006/0081079 | A1 | * | 4/2006 | Jaecklin .............. | F16H 25/2454 74/89.23 |
| 2006/0163014 | A1 | * | 7/2006 | Crewson .................. | F16D 65/56 188/196 BA |

(Continued)

FOREIGN PATENT DOCUMENTS

| | | |
|---|---|---|
| CN | 102410350 A | 4/2012 |
| DE | 202007001797 U1 | 4/2007 |

(Continued)

*Primary Examiner* — William Kelleher
*Assistant Examiner* — Gregory Prather
(74) *Attorney, Agent, or Firm* — Chun-Ming Shih; HDLS IPR Services

(57) ABSTRACT

A linear actuator (1) includes an actuator mechanism (10), a telescopic mechanism (20) and a quick release mechanism (30, 30a). The quick release mechanism (30, 30a) includes a transferring set (31, 31a) connected with the telescopic tube (20), a supporting set (32, 32a) and a braking worm gear (33, 33a) sleeved on the transferring set (31, 31a), a braking worm shaft (34, 34a) connected with the supporting set (32, 32a) and selectively braking the braking worm gear (33, 33a). An elastic pressing assembly (35, 35a) presses elastically on the worm shaft (34, 34a), and the elastic pressing assembly exerted by an external force can adjust the pressing force pressed on the braking worm shaft (34, 34a).

33 Claims, 12 Drawing Sheets

(56) References Cited

U.S. PATENT DOCUMENTS

| | | | | |
|---|---|---|---|---|
| 2010/0122879 | A1* | 5/2010 | Louis | B60T 7/108 188/79.55 |
| 2010/0213310 | A1* | 8/2010 | Flatt | B64C 13/50 244/99.2 |
| 2011/0079486 | A1* | 4/2011 | Tseng | F16H 25/2454 192/223.2 |
| 2012/0227522 | A1* | 9/2012 | Wu | F16H 25/20 74/89.14 |
| 2013/0169088 | A1* | 7/2013 | Wu | H02K 7/102 310/77 |
| 2014/0202271 | A1* | 7/2014 | Oberndorfer | H02K 7/06 74/89.37 |
| 2014/0326089 | A1* | 11/2014 | Wu | F16H 25/20 74/89.23 |
| 2014/0338480 | A1* | 11/2014 | Wu | F16H 25/20 74/89.23 |

FOREIGN PATENT DOCUMENTS

| | | |
|---|---|---|
| TW | M275836 U | 9/2005 |
| TW | M385621 U1 | 8/2010 |
| TW | M460658 U1 | 9/2013 |

* cited by examiner

LINEAR ACTUATOR WITH SPEED-ADJUSTABLE QUICK RELEASE MECHANISM

BACKGROUND OF THE INVENTION

1. Field of the Invention

The present invention generally relates to linear actuators and, in particular to a linear actuator device with a speed-adjustable quick release mechanism.

2. Description of Prior Art

A linear actuator usually uses driving components such as an electric motor, a worm shaft and a worm gear etc. to drive a lead screw rotating. Meanwhile, a telescopic tube screwed with the lead screw will perform a linear extend or retract motion with respect to an outer tube sleeved on the telescopic tube. Because the linear actuator has a simple and convenient structure and installation with respect to gas or hydraulic cylinders, the linear actuator is widely applied in hospital beds, electrical chairs and other medical devices and equipments or other fields which a telescopic motion is needed.

Take a linear actuator applied for adjusting a hospital bed for example, such as Taiwan Utility Model NO. M275836 with title "A quick release mechanism of a hospital bed actuator". The patent discloses a hospital bed with an actuator for tilt controlling. The actuator has a telescopic tube connecting with an adjustment frame of the hospital bed. The telescopic tube is inserted in an outer tube, and the telescopic tube is sleeved on a lead screw. The lead screw also sleeves with a worm gear and a spring. The quick release mechanism has a pressing pole disposed between the lead screw and the worm gear. The telescopic tube rotates downward rapidly by actuating the pressing pole to pull the worm gear and the lead screw apart for achieving a quick release of the hospital bed.

The above quick release mechanism can be functioned to make a hospital bed back to its original position quickly for an immediately treatment in an emergency or a power outage situation. However, if the quick release for returning a hospital bed back to its original position is performed in a power outage situation, a large impact makes a patient discomfort. Hence, how to develop a speed-adjustable quick release mechanism is an object of the inventor.

In view of the above drawbacks, the Inventor proposes the present invention based on his expert knowledge and elaborate researches in order to solve the problems of prior art.

SUMMARY OF THE INVENTION

Accordingly, an object of the present invention is to provide a linear actuator with a speed adjustable quick release mechanism that can be functioned in a power outage situation.

In order to achieve the object mentioned above, the present invention provides a linear actuator includes an actuator mechanism, a telescopic mechanism and a quick release mechanism. The actuator mechanism includes a motor and a lead screw driven by the motor. The telescopic mechanism includes a screw nut sheathed axially on the lead screw and a telescopic tube inserted in the screw nut. The quick release mechanism is disposed at an outer end of the telescopic tube. The mechanism comprises a transferring set, a supporting set, a braking worm gear, a braking worm shaft and an elastic pressing assembly. The transferring set is connected with the telescopic tube, and transferring set has a column at a lateral side. The supporting set is sleeved on the column, and the supporting set has a pair of lugs. The braking worm gear is disposed axially on the transferring set. The braking worm shaft is disposed between the pair of lugs and selectively brakes the braking worm gear. The elastic pressing assembly presses elastically on the worm shaft, and the elastic pressing assembly adjusts a pressing force by an external force. The restraining level between braking worm gear and the braking worm shaft is determined by the strength of the pressing force, and the retraction speed of the telescopic tube is adjusted through the restraining level between the braking worm gear and the braking worm shaft.

Accordingly, an object of the present invention is to provide a speed adjustable quick release mechanism of a linear actuator, which can be released in a power outage situation and reduced impact by adjusting speed when released.

In order to achieve the object mentioned above, the present invention provides a speed adjustable quick release mechanism of a linear actuator. The linear actuator includes an actuator mechanism, a telescopic mechanism driven by the actuator mechanism and a telescopic mechanism. The quick release mechanism disposed at an outer end of the telescopic mechanism includes a transferring set, a supporting set, a braking worm gear, a braking worm shaft and an elastic pressing assembly. The transferring set is connected with the telescopic tube, and the transferring set has a column at a lateral side. The supporting set is sleeved on the column, and the supporting set has a pair of lugs. The braking worm gear is disposed axially on the transferring set. The braking worm shaft is disposed between the pair of lugs and is selectively brakes the braking worm gear. The elastic pressing assembly presses elastically on the worm shaft, and the elastic pressing assembly adjusts a pressing force by an external force. The restraining level between braking worm gear and the braking worm shaft is determined by the strength of the pressing force, and the retraction speed of the telescopic tube is adjusted through the restraining level between the braking worm gear and the braking worm shaft.

Comparing to the prior art, the linear actuator of the present invention has a quick release mechanism. The quick release mechanism can adjust a pressing force of the braking worm shaft exerted on the barking worm gear. According to the pressing strength, the restraining level between the braking worm gear and the braking worm shaft will be determined. And the retraction speed of the telescopic tube is adjusted through the restraining level between the braking worm gear and the braking worm shaft.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
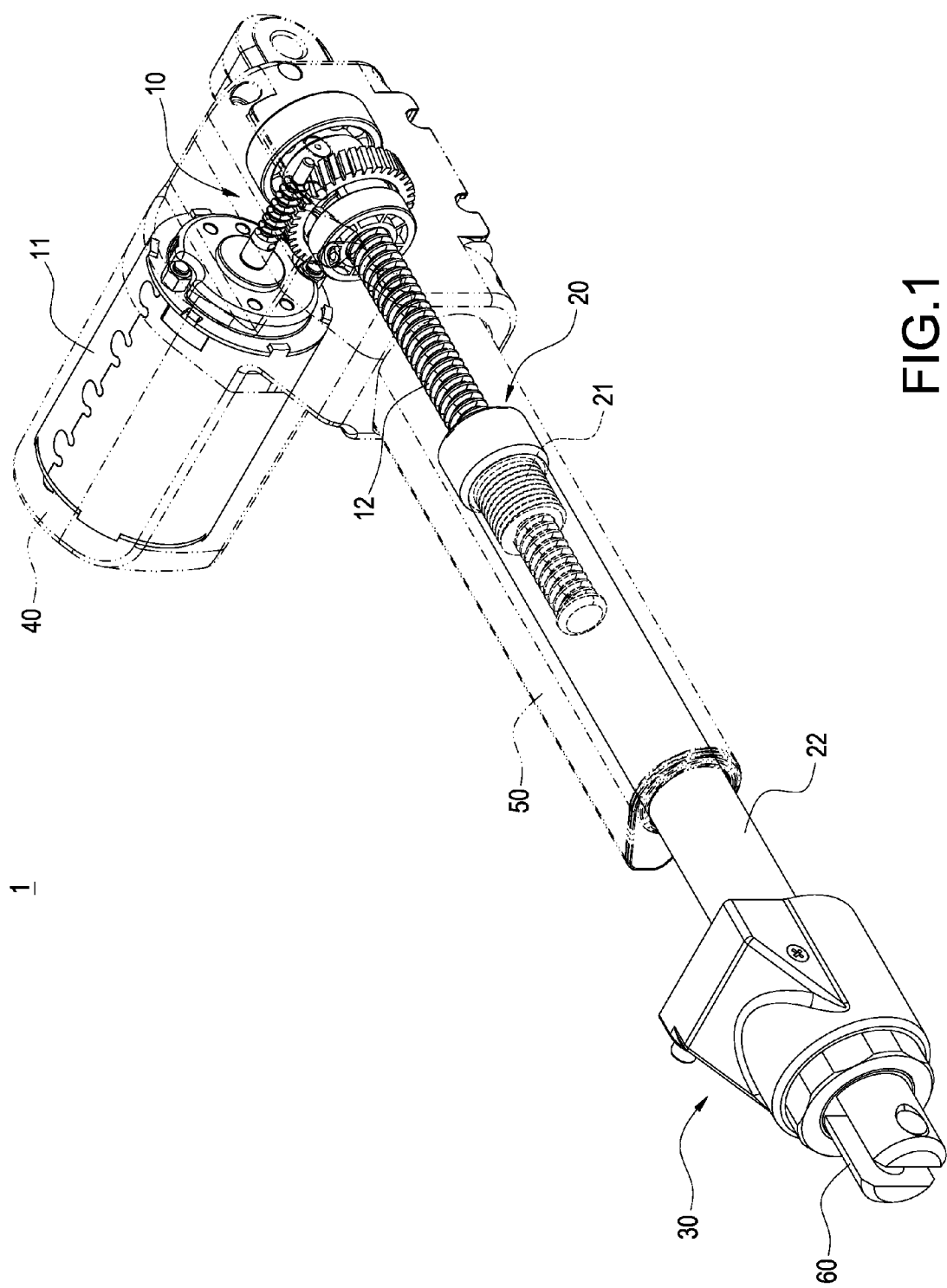
FIG. 1 is a perspective schematic view of a linear actuator of the present invention.
Figure 2:
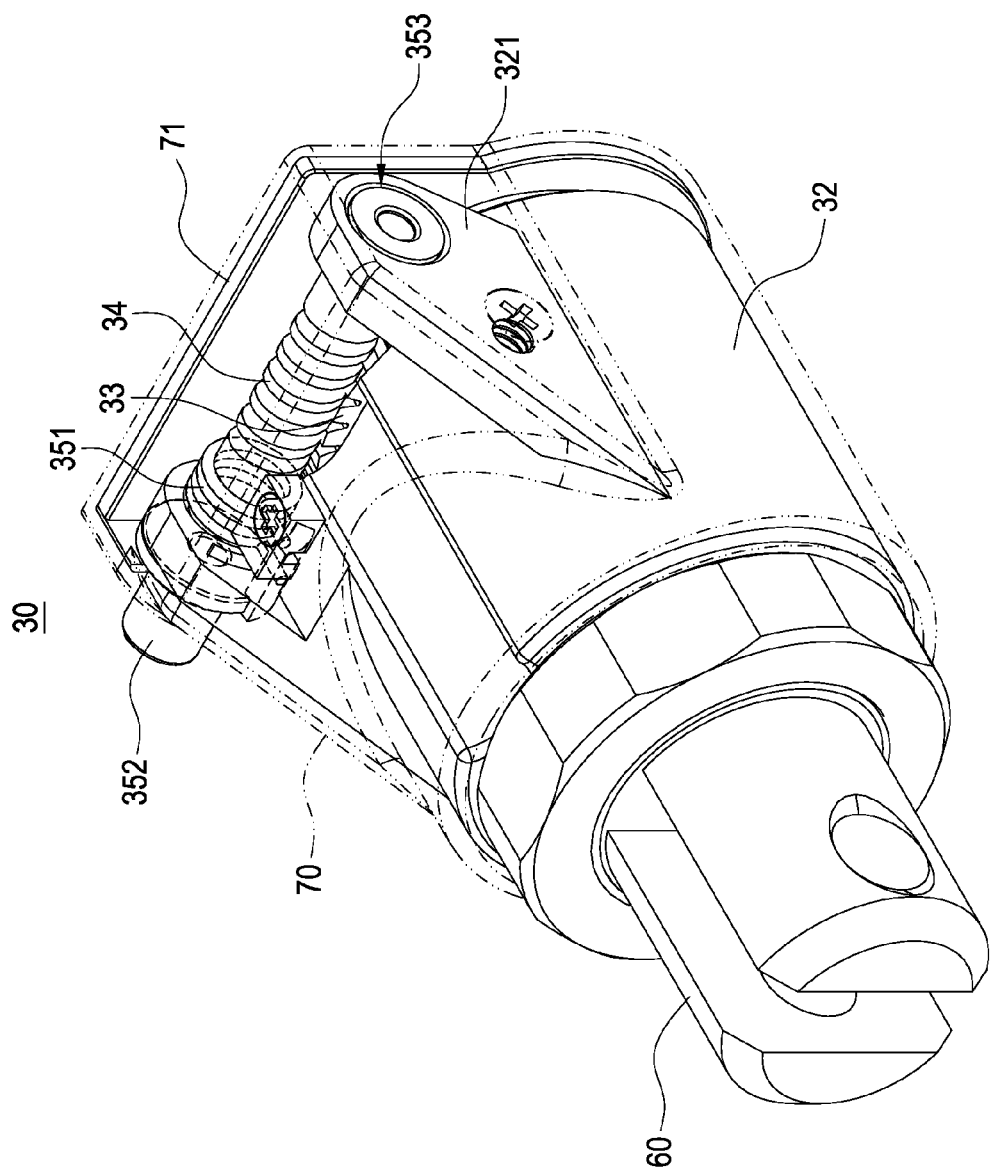
FIG. 2 is a perspective schematic view of a quick release mechanism of the present invention.
Figure 3:
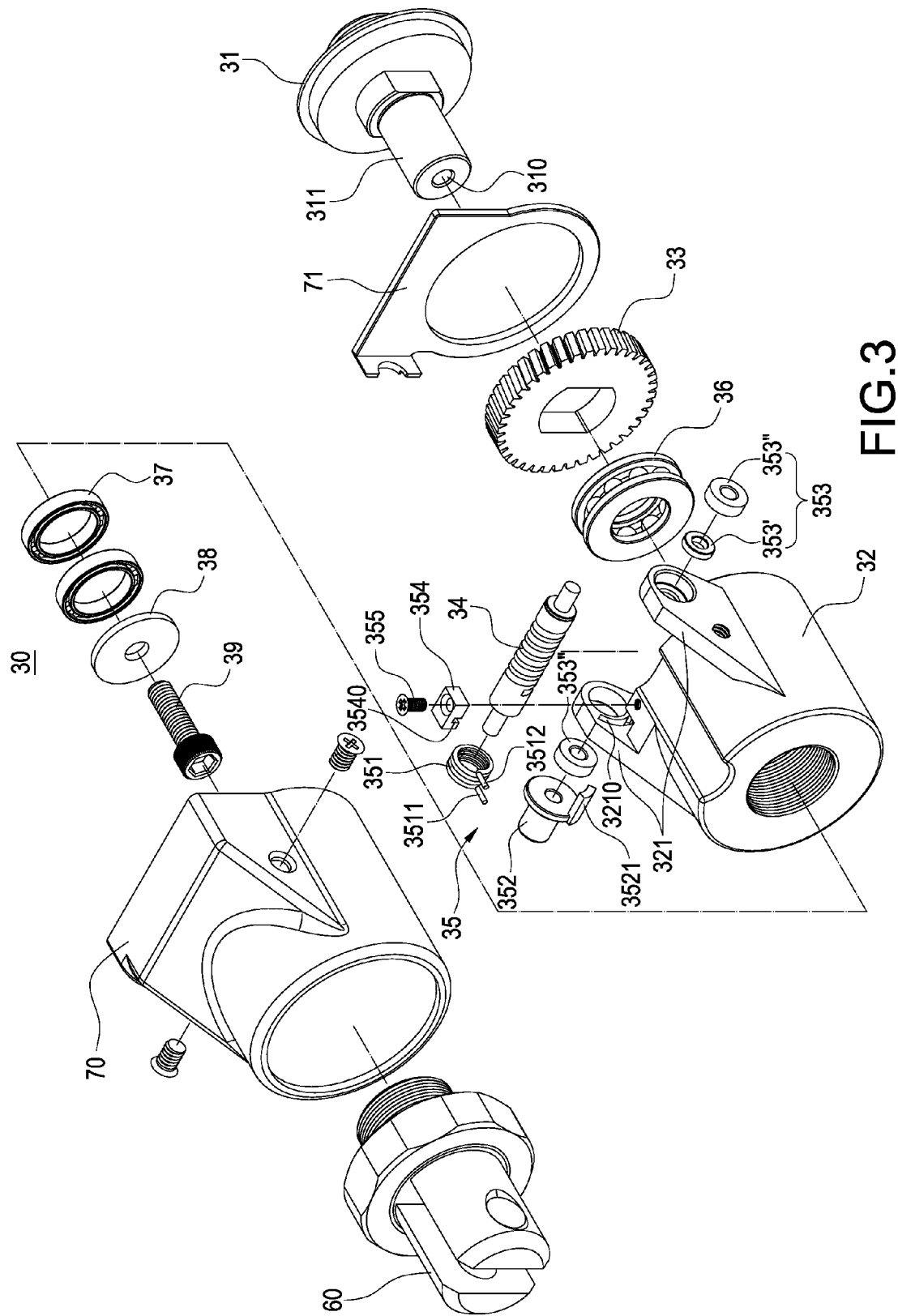
FIG. 3 is a perspective schematic view of a side of the quick release mechanism of the present invention.
Figure 4:
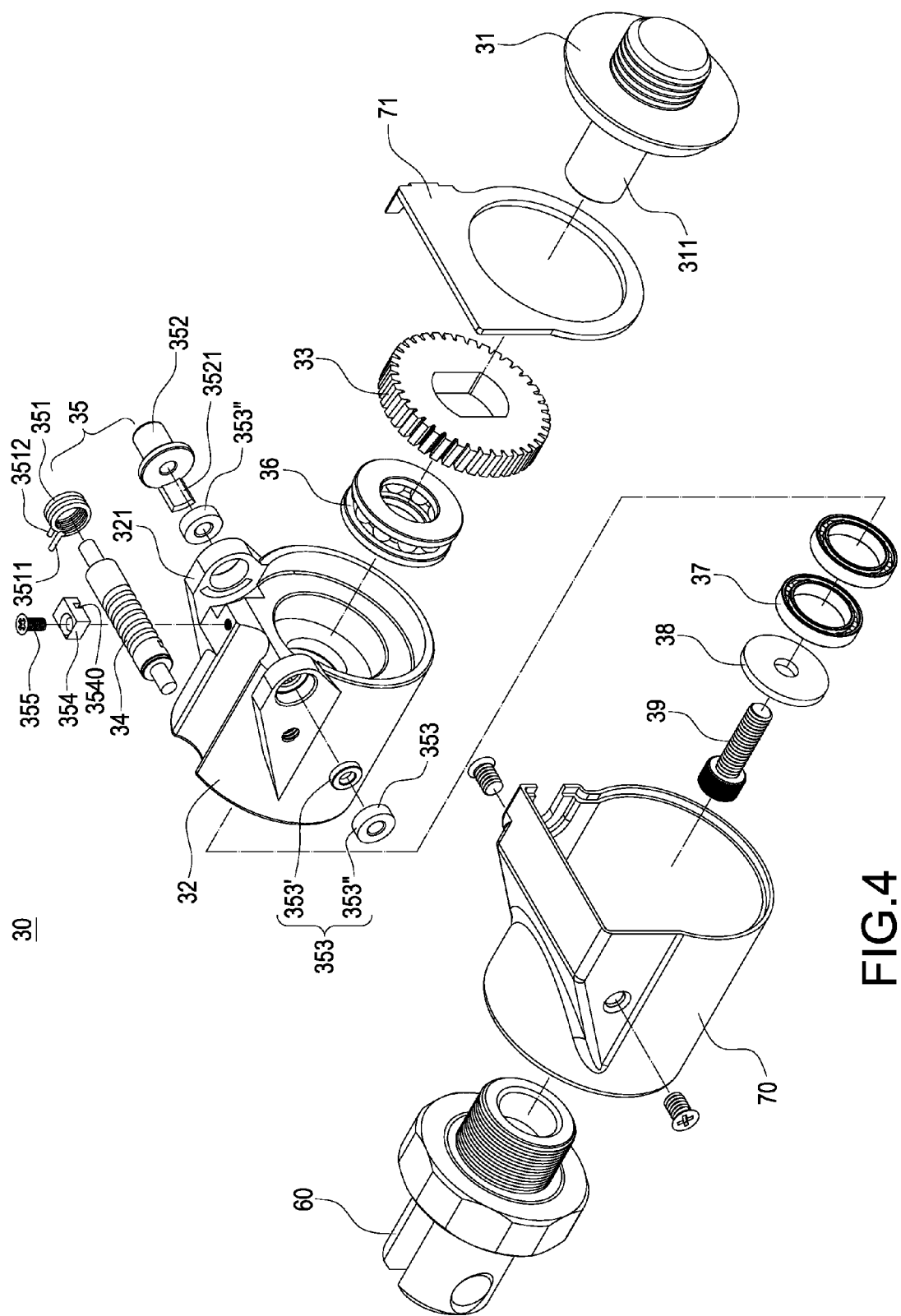
FIG. 4 is a perspective schematic view of another side of the quick release mechanism of the present invention.
Figure 5:
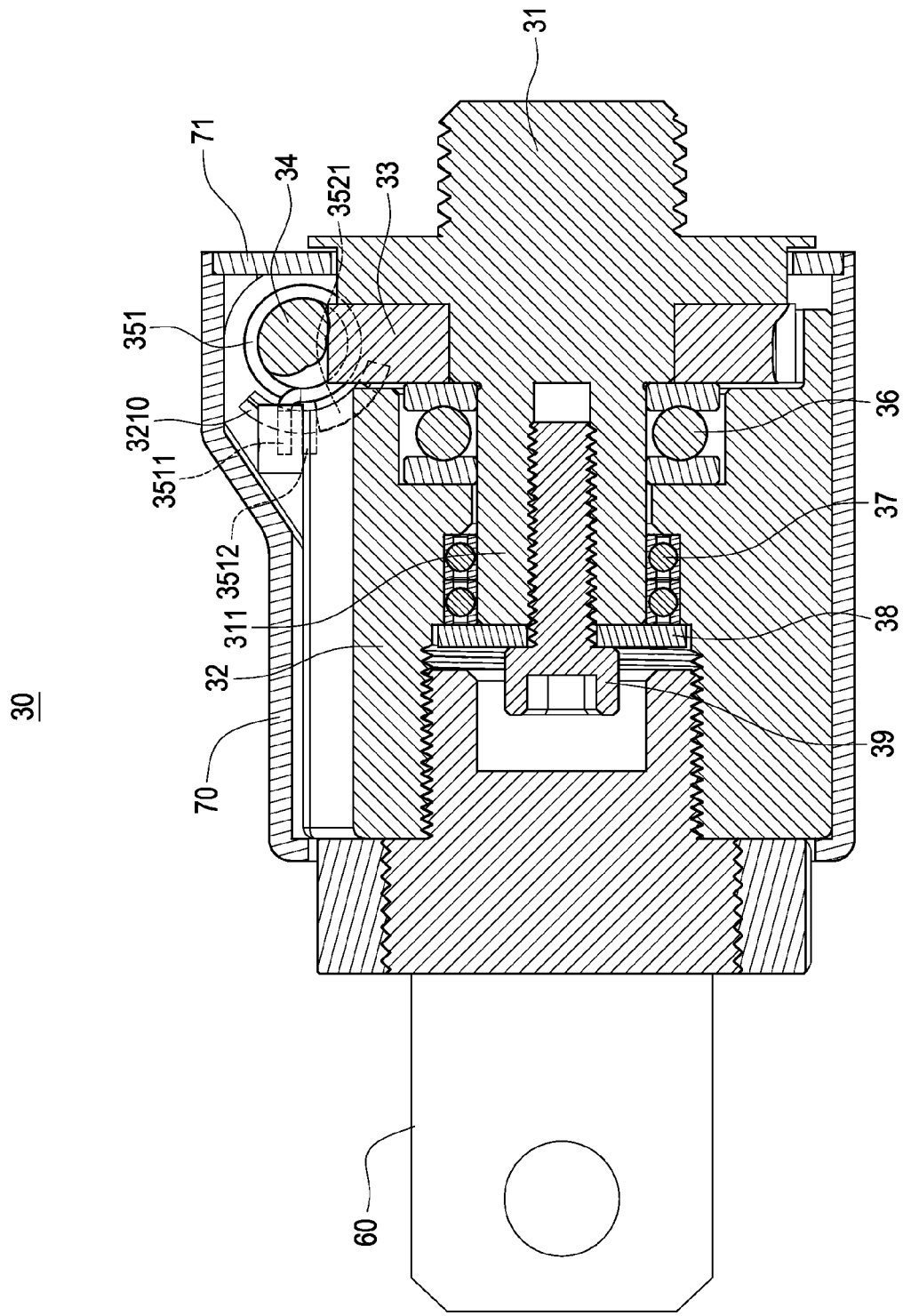
FIG. 5 is an assembly cross sectional view of the quick release mechanism of the present invention.

Please refer to FIG. 1, it depicts a perspective schematic view of a linear actuator of the present invention. The linear actuator 1 includes an actuator mechanism 10, a telescopic mechanism 20 and a quick release mechanism 30. The actuator mechanism 10 includes a motor 11 and a lead screw 12 driven by the motor 11. The telescopic mechanism 20 includes a screw nut 21 sheathed axially on the lead screw 12 and a telescopic tube 22 inserted in the screw nut 21. The quick release mechanism 30 is disposed at an outer end of the telescopic tube 22. With the quick release mechanism 30, the telescopic tube 22 will be retracted when the quick release mechanism 30 is released in a power outage situation. Moreover, the retraction speed of the telescopic tube 22 can be adjusted by the quick release mechanism 30.

In the present embodiment, the linear actuator 1 further includes a base 40 and an outer tube 50 connected with the base 40. The actuator mechanism 10 is accommodated in the base 40. The screw nut 21 is disposed in the outer tube 50, and an end of the telescopic tube 22 is exposed out of the outer tube 50.

Please also refer to FIG. 2 to FIG. 5, they depict a perspective schematic view of a quick release mechanism, two sides of perspective explosion views and an assembly cross sectional view of the present invention. The quick release mechanism 30 includes a transferring set 31, a supporting set 32, a braking worm gear 33, a braking worm shaft 34 and an elastic pressing assembly 35. In an embodiment of the present invention, the quick release mechanism 30 further includes a pivot seat 60. The pivot seat 60 is fixed at an outer end of the supporting set 32.

The transferring set 31 is connected with the telescopic tube 22, and the transferring set 31 has a column 311 at a lateral side. The supporting set 32 is sleeved on the column 311, and the supporting set 32 has a pair of lugs 321. The braking worm gear 33 is disposed axially on the column 311 of the transferring set 31. Besides, the braking worm shaft 34 is disposed between the pair of lugs 321 and selectively bakes the braking worm gear 33.

The elastic pressing assembly 35 presses elastically on the braking worm shaft 34, and the elastic pressing assembly 35 adjusts a pressing force by an external force. Thereby, the restraining level between braking worm gear 33 and the braking worm shaft 34 is determined by the strength of the pressing force, and the retraction speed of the telescopic tube 22 is adjusted through the restraining level between the braking worm gear 33 and the braking worm shaft 34、34*a*. When a strong pressing force is exerted, the braking worm shaft 34 will press the braking worm gear 33 and stop rotating. In other words, the braking worm gear 33 cannot rotating by the braking of the braking worm shaft 34, and the linear actuator 1 is functioned normally.

In an embodiment of the present invention, the quick release mechanism 30 further includes at least one thrust bearing 36 and at least one ball bearing 37 disposed between the transferring set 31 and the supporting set 32. The thrust bearing 36 sleeves on the column 311 and leans against the supporting set 32 axially, and the ball bearing 37 sleeves on the column 311 and leans against the supporting set 32 radially.

Preferably, the quick release mechanism 30 further includes a blocking plate 38 and a screw post 39. The blocking plate 38 is positioned on the column 311 and blocked at a lateral side of the ball bearing 37. Furthermore, the column 311 is provided with a screw hole 310 in an end correspondingly. The screw post 39 is inserted in the blocking plate 38 and combined in the screw hole 310. The structure of the elastic pressing assembly 35 is described more detailed later.

In the present invention, the elastic pressing assembly 35 includes a torsion spring 351 sleeved on the braking worm shaft 34 and a knob 352. The torsion spring 351 has a fixed end 3511 fixed on the supporting set 32 and a free end 3512 spin out from the braking worm shaft 34 by a push of the knob 352.

Besides, the torsion spring 351 and the knob 352 are disposed separately on two sides of one of the lugs 321. The knob 352 is protruded with a toggle plate 3521, and the lug 321 is provided with a trough 3210 correspondingly. The toggle plate 3521 is inserted the trough 3210 and positioned on a side of the free end 3512. In real practice, the toggle plate 3521 is a curved piece, and the trough 3210 is formed in an arc shape correspondingly.

Moreover, the elastic pressing assembly 35 further includes at least one supporter 353, a holder 354 and a fastener 355. The supporter 353 is sleeved on an end of the braking worm shaft 34 and combined at a side of the lug 321 for providing supporting to the braking worm shaft 34 therebetween. The holder 354 and the fastener 355 are used for fixing the torsion spring 351. The holder 354 is pressed against the fixed end 3511 of the torsion spring 351 and combines to the supporting set 32 through the fastener 355. In real practice, the holder 354 has a position slot 3540, and the fixed end 3511 of the torsion spring 351 is inserted in the position slot 3540 for fixing. In the present invention, the supporter 353 includes a washer 353' and a pair of bearing 353". Preferably, the pair of the bearing 353" can be provided as a thrust bearing or a ball bearing for meeting the requirements.

In an embodiment of the present invention, the quick release mechanism 30 further includes a shell 70 and an overlay 71. The shell 70 sleeves on the supporting set 32, and the pivot seat 60 is exposed out of a side of the shell 70. The overlay 71 is sleeved on the transferring set 31 and sealed another side of the shell 70.

Figure 6:
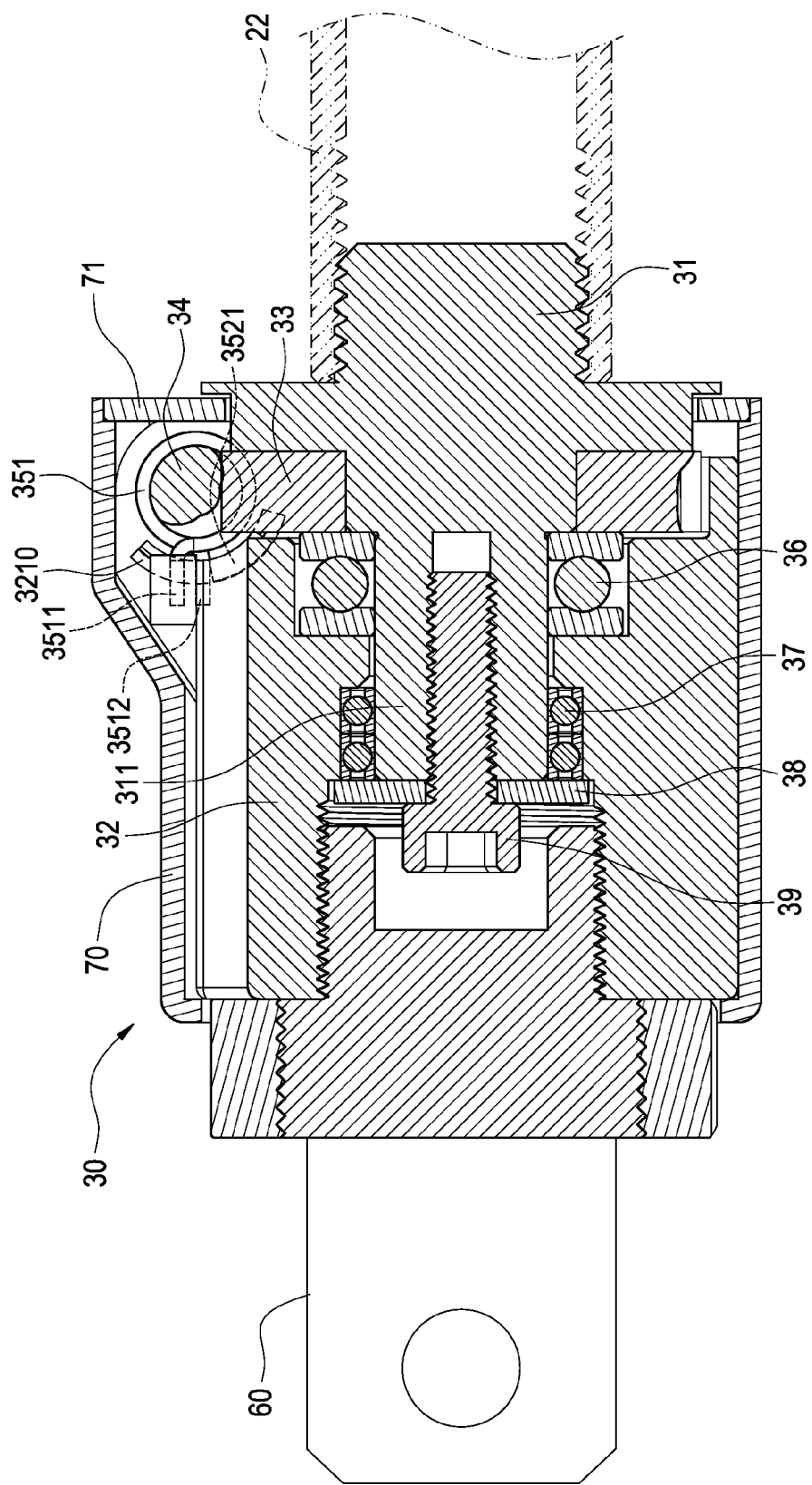
FIG. 6 is an assembly cross sectional view of the quick release mechanism and telescopic tube of the present invention.
Figure 7:
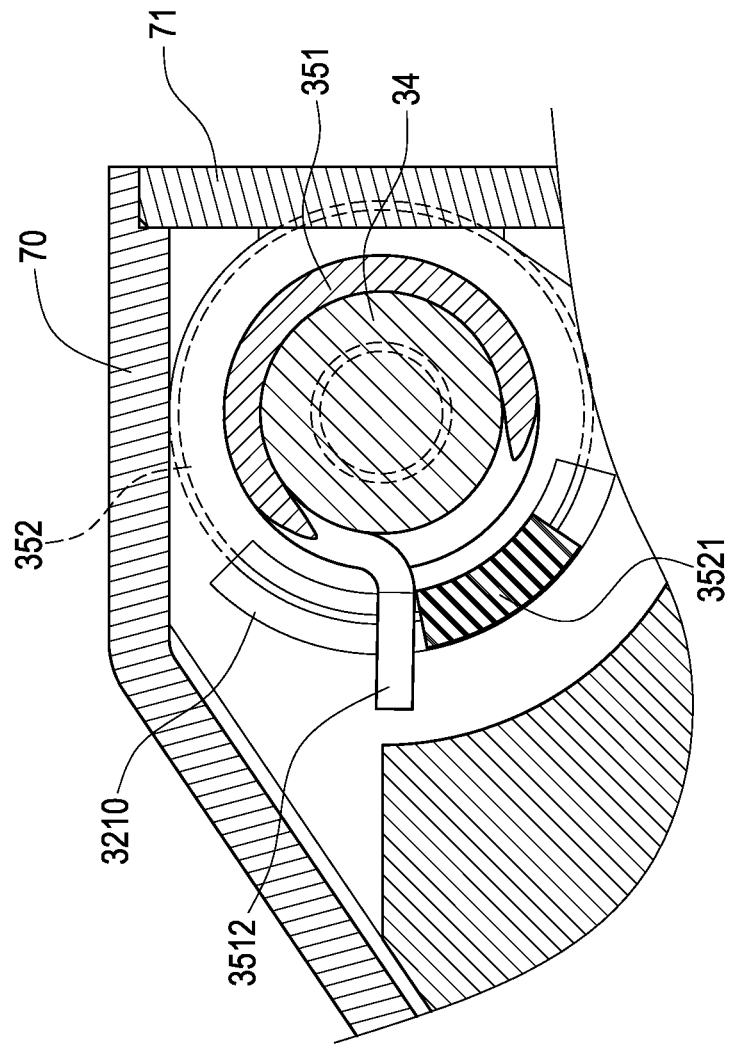
FIG. 7 is a partial enlarge cross sectional view of the quick release mechanism of the present invention.

Please refer to FIG. 6 and FIG. 7, they depict an assembly cross sectional view and a partial enlarge cross sectional view of a quick release mechanism of the present invention. When the quick release mechanism 30 assembles, another side of the transferring set 31 corresponding to the column 311 is screwed with the telescopic tube 22, and the braking worm shaft 34 presses the braking worm gear 33. FIG. 7 shows an assembling cross sectional view of the torsion spring and the braking worm shaft. The torsion spring 351 sleeves tightly on the braking worm shaft 34 and brakes the braking worm shaft 34 from rotating. And the toggle plate 3521 of the knob 352 is stopped at the free end 3512 of the knob 352.

Figure 8:
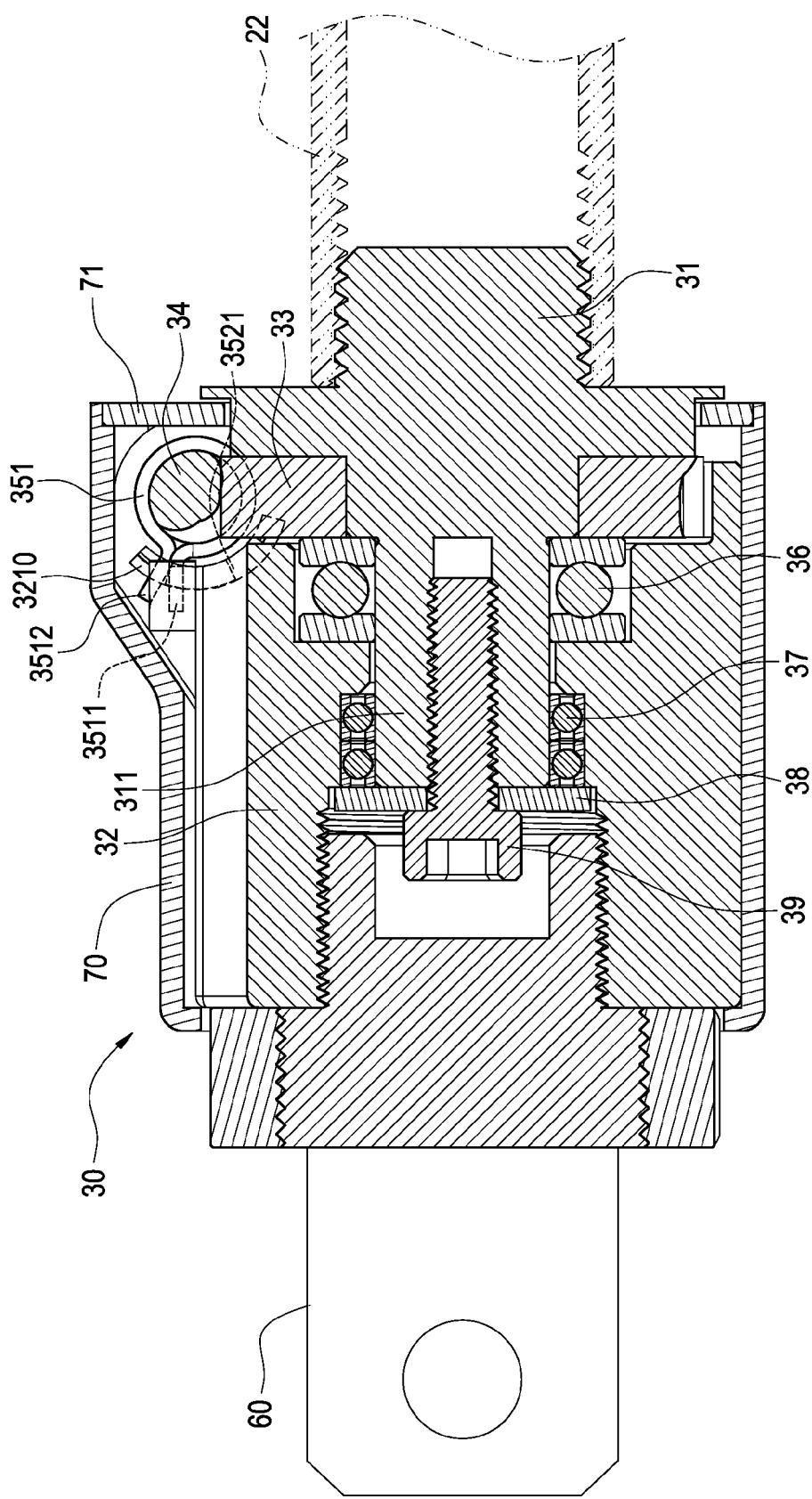
FIG. 8 is an operation schematic view showing operation of the quick release mechanism of the present invention.
Figure 9:
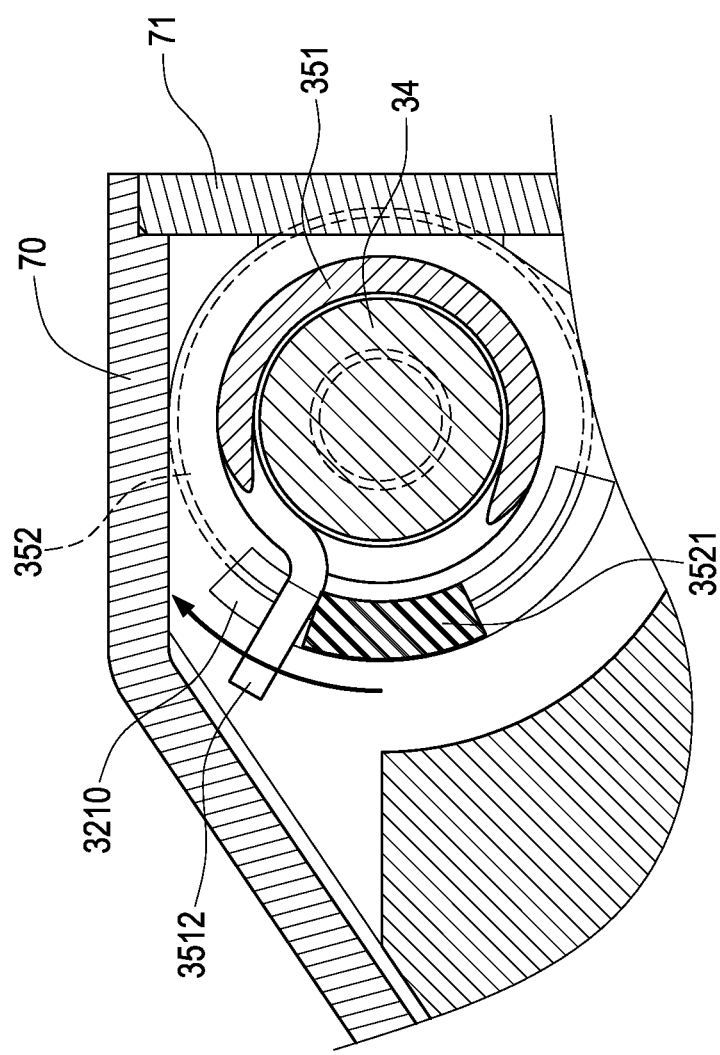
FIG. 9 is a partial enlarge cross sectional view of the quick release mechanism of the present invention.

Please refer to FIG. 8 and FIG. 9, they depict an operation schematic view showing operation of the quick release mechanism and a partial enlarge cross sectional view of the quick release mechanism of the present invention. In a power outage situation, users can operate the quick release mechanism 30 to retract the telescopic tube 22. When the quick release mechanism 30 is functioned, users can toggle the toggle plate 3521 to spin out from the free end 3512 of the torsion spring 351. While a binding force between the torsion spring 351 and the braking worm shaft 34 is reduced, the braking worm shaft 34 can rotate slightly. Then the braking worm gear 33 is free from the braking worm shaft 34 and is rotatable. Thus the braking worm gear 33 will rotate relative to the supporting set 32 and retract with the telescopic tube 22.

Moreover, because the binding force between the torsion spring 351 and the braking worm shaft 34 can determine the pressing force value of the braking worm shaft 34 pressed to the braking worm gear 33, and further determine the braking level therebetween. Therefore, users can control the binding force between the torsion spring 351 and the braking worm shaft 34 through the toggle angle of the knob 352, and the retraction speed of the telescopic tube 22 will be controlled.

Figure 10:
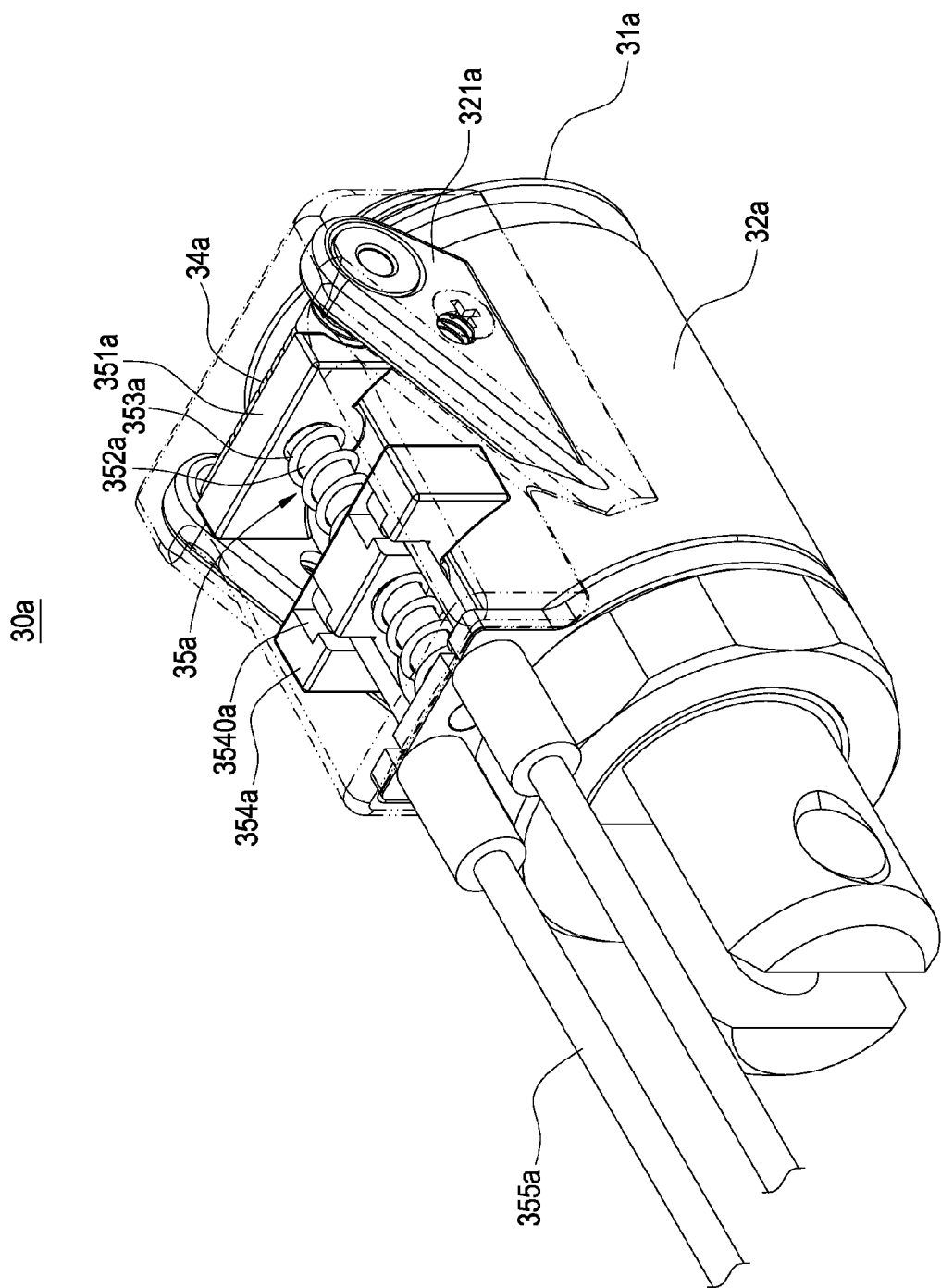
FIG. 10 is a perspective schematic view of a second embodiment of the quick release mechanism of the present invention.
Figure 11:
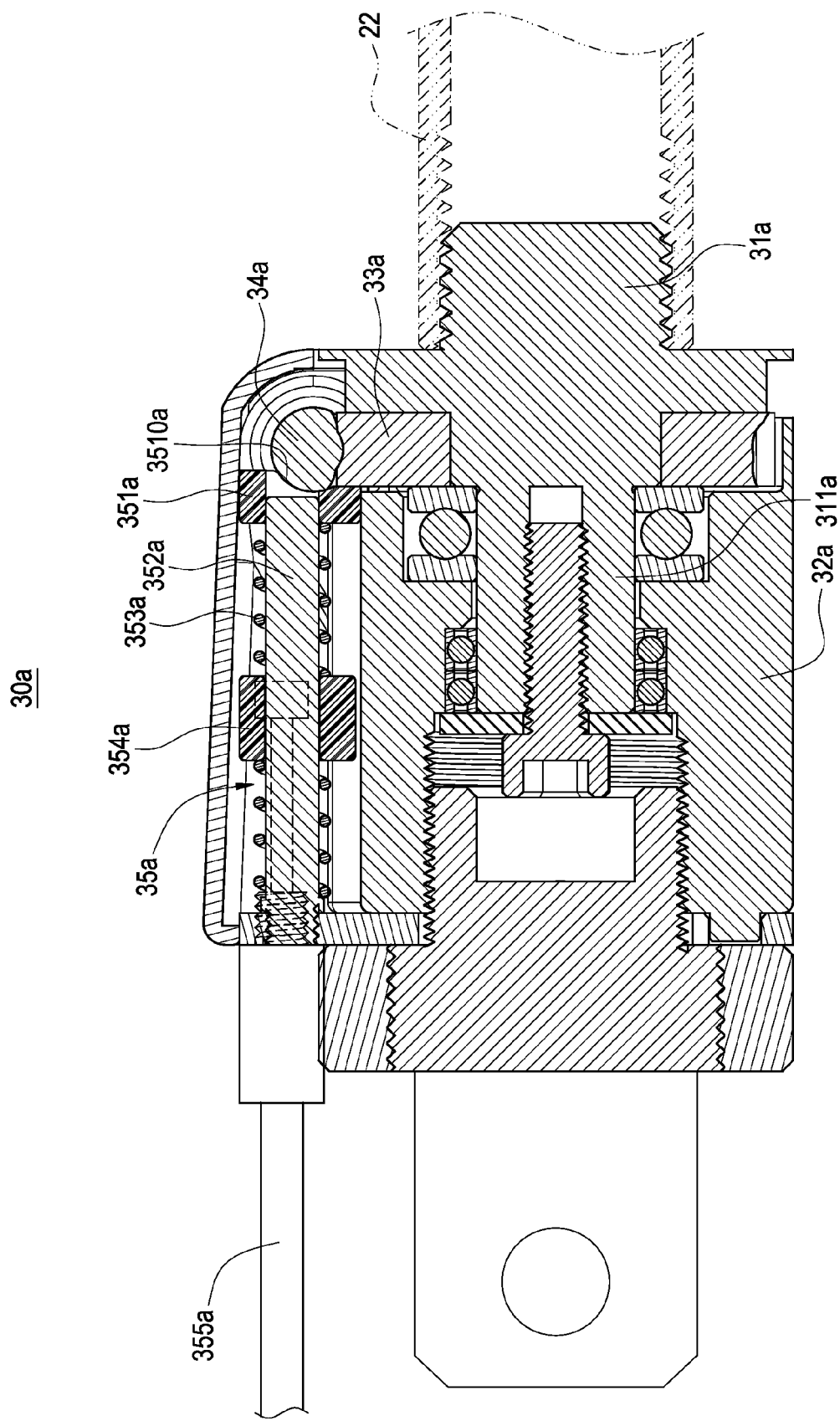
FIG. 11 is an assembly cross sectional view of a second embodiment of the quick release mechanism of the present invention.

Please refer to FIG. 10 and FIG. 11, they depict a perspective schematic view and an assembly cross sectional view of a second embodiment of the quick release mechanism of the present invention. The present embodiment is similar to the first embodiment. The quick release mechanism 30a includes a transferring set 31a, a supporting set 32a, a braking worm gear 33a, a braking worm shaft 34a and an elastic pressing assembly 35a. The embodiment of the present invention differs in the elastic pressing assembly 35a.

In the present embodiment, the elastic pressing assembly 35a includes a first pressing piece 351a resisting against the braking worm shaft 34a, a link 352a connecting with the first pressing piece 351a, a compression spring 353a and a second pressing piece 354a sleeved on the link 352a, and a pull rod 355a connecting with the second pressing piece 354a. The second pressing piece 354a exerted by the pull rod 355a is forced on the first pressing piece 351a through the compression spring 353a. Thus the braking worm shaft 34a pressed the braking worm gear 33a, and the first pressing piece 351a presses the braking worm shaft 34a to be braked.

Preferably, the first pressing piece 351a has formed with an arc surface 3510a, and the arc surface 3510a is abutted on a side of the braking worm shaft 34a. The second pressing piece 354a is located at the middle of the compression spring 353a correspondingly. Moreover, the second pressing piece 354a has a clip slot 3540a, and one end of the pull rod 355a is snapped in the clip slot 3540a.

Figure 12:
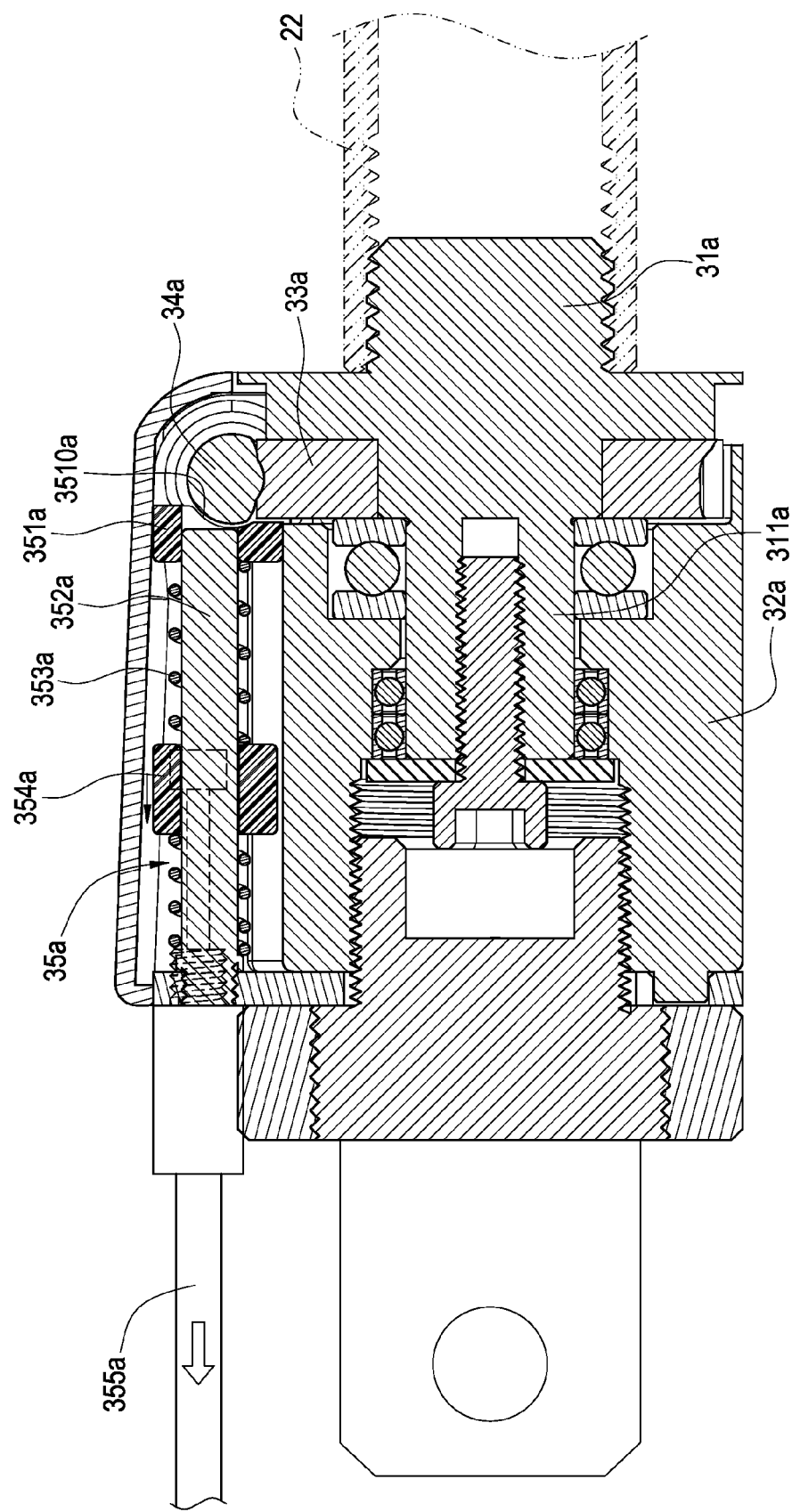
FIG. 12 is an operation schematic view showing operation of the second embodiment of the quick release mechanism of the present invention.

With referring to FIG. 12, it depicts an operation schematic view showing operation of the second embodiment of the quick release mechanism of the present invention. The present embodiment is similar to the first embodiment, users can function the quick release mechanism 30a to retract the telescopic tube 22 in a power outage situation. When the quick release mechanism 30a starts, users can pull the pull rod 355a to make the second pressing piece 354a moved away from the braking worm shaft 34a for reducing the pressing force of the compression spring 353a pressed to the first pressing piece 351a and the braking worm shaft 34a, so the braking worm shaft 34a can rotate slightly. Then the braking worm gear 33a will depart from the braking of the braking worm shaft 34a. Thus the braking worm gear 33a can rotate with respect to the supporting set 32a and retract with the telescopic tube 22a.

It is worth notice that the pressing force between the torsion spring 351a and the braking worm shaft 34a can determine the braking level between the braking worm shaft 34a and the braking worm gear 33a. Therefore, users can control the pressing force of the compression spring 353a to the braking worm shaft 34a by pulling the pull rod 355a, and the retraction speed of the telescopic tube 22a will be controlled.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A linear actuator (1), comprising:
   an actuator mechanism (10) including a motor (11) and a lead screw (12) driven by the motor (11);
   a telescopic mechanism (20) including a screw nut (21) sheathed axially on the lead screw (12) and a telescopic tube (22) inserted in the screw nut (21); and
   a quick release mechanism (30, 30a) disposed at an outer end of the telescopic tube (22), comprising;
   a transferring set (31, 31a) connected with the telescopic tube (22), and the transferring set (31, 31a) having a column (311) at a lateral side;
   a supporting set (32, 32a) sleeved on the column (311), and the supporting set (32, 32a) having a pair of lugs (321);
   a braking worm gear (33, 33a) disposed axially on the transferring set (31,31a);
   a braking worm shaft (34, 34a) disposed between the pair of lugs (321) and selectively braking the braking worm gear (33, 33a); and
   an elastic pressing assembly (35, 35a) pressing elastically on the worm shaft (34, 34a), and the elastic pressing assembly (35, 35a) adjusting a pressing force when an external force is applied by a user;
   wherein, the restraining force between braking worm gear (33, 33a) and the braking worm shaft (34, 34a) being determined by the strength of the pressing force, and the retraction speed of the telescopic tube (22) being adjusted through the restraining force between the braking worm gear (33, 33a) and the braking worm shaft (34, 34a).

2. The linear actuator according to claim 1, wherein the quick release mechanism (30, 30a) further includes at least one ball bearing (37) disposed between the transferring set (31, 31a) and the supporting set (32, 32a), the ball bearing (37) sleeves on the column (311) and leans against the supporting set (32, 32a) radially.

3. The linear actuator according to claim 2, wherein the quick release mechanism (30, 30a) further includes a blocking plate (38), the blocking plate (38) is positioned on the column (311) and blocking one side of the ball bearing (37).

4. The linear actuator according to claim 3, wherein the quick release mechanism (30, 30a) further includes a screw post (39), the column (311) is provided with a screw hole (310) correspondingly, and the screw post (39) is inserted in the blocking plate (38) and combined in the screw hole (310).

5. The linear actuator according to claim 1, wherein the elastic pressing assembly (35, 35a) includes a torsion spring (351) sleeved on the braking worm shaft (34, 34a) and a knob (352), the torsion spring (351) has a fixed end (3511) fixed on the supporting set (32, 32a) and a free end (3512) spinning out from the braking worm shaft (34, 34a) by a push of the knob (352).

6. The linear actuator according to claim 5, wherein the torsion spring (351) and the knob (352) are disposed separately on two sides of one of the lugs (321).

7. The linear actuator according to claim 6, wherein the knob (352) is protruded with a toggle plate (3521), and the lug (321) is provided with a trough (3210) correspondingly, the toggle plate (3521) is inserted in the trough (3210) and positioned on a side of the free end (3512).

8. The linear actuator according to claim 7, wherein the toggle plate (3521) is a curved piece, and the trough (3210) is formed in an arc shape.

9. The linear actuator according to claim 5, wherein the elastic pressing assembly (35, 35a) further includes a holder (354) and a fastener (355), the holder (354) is pressed against the fixed end (3511) of the torsion spring (351) and is combined with the supporting set (32, 32a) through the fastener (355).

10. The linear actuator according to claim 9, wherein the holder (354) has a position slot (3540), and the fixed end (3511) of the torsion spring (351) is inserted in the position slot (3540).

11. The linear actuator according to claim 1, wherein the elastic pressing assembly (35, 35a) further includes at least one supporter (353), the supporter (353) is sleeved on an end of the braking worm shaft (34, 34a) and combined at a side of the lug (321).

12. The linear actuator according to claim 1, wherein the elastic pressing assembly (35, 35a) includes a first pressing piece (351a) resisting against the braking worm shaft (34, 34a), a link (352a) connecting with the first pressing piece (351a), a compression spring (353a) and a second pressing piece (354a) sleeved on the link (352a) and a pull rod (355a) connecting with the second pressing piece (354a), the second pressing piece (354a) exerted by the pull rod (355a) is forced on the first pressing piece (351a) through the compression spring (353a).

13. The linear actuator according to claim 12, wherein the first pressing piece (351a) has formed with an arc surface (3510a), the arc surface (3510a) is abutted on a side of the braking worm shaft (34, 34a).

14. The linear actuator according to claim 12, wherein the second pressing piece (354a) is located at a middle of the compression spring (353a) correspondingly.

15. The linear actuator according to claim 12, wherein the second pressing piece (354a) has a clip slot (3540a), and one end of the pull rod (355a) is snapped in the clip slot (3540a).

16. A speed adjustable quick release mechanism (30, 30a) of a linear actuator, the linear actuator including an actuator mechanism (10), a telescopic mechanism (20) driven by the actuator mechanism (10) and a telescopic mechanism (20), and the quick release mechanism (30, 30a) disposed at an outer end of the telescopic mechanism (20), the mechanism (30, 30a) including:
  a transferring set (31, 31a) connected with the telescopic mechanism (20), and the transferring set (31, 31a) having a column (311) at a lateral side;
  a supporting set (32, 32a) sleeved on the column (311), and the supporting set having a pair of lugs (321);
  a braking worm gear (33, 33a) disposed axially on the transferring set (31,31a);
  a braking worm shaft (34, 34a) disposed between the pair of lugs (321) and selectively braking the braking worm gear (33, 33a); and
  an elastic pressing assembly (35, 35a) pressing elastically on the worm shaft (34, 34a), and the elastic pressing assembly (35, 35a) adjusting a pressing force when an external force is applied by a user;
  wherein, the restraining force between braking worm gear (33, 33a) and the braking worm shaft (34, 34a) being determined by the strength of the pressing force, and the retraction speed of the telescopic mechanism (20) being adjusted through the restraining force between the braking worm gear (33, 33a) and the braking worm shaft (34, 34a).

17. The mechanism to claim 16, wherein the actuator mechanism includes a motor (11) and a lead screw (12) driven by the motor (11), and the telescopic mechanism (20) includes a screw nut (21) sheathed axially on the lead screw (12) and a telescopic tube (22) inserted in the screw nut (21), the transferring set (31, 31a) is connected with the telescopic tube (22).

18. The mechanism to claim 16, further including at least one ball bearing (37) disposed between the transferring set (31, 31a) and the supporting set (32, 32a), wherein the ball bearing (37) sleeves on the column (311) and leans against the supporting set (32, 32a) radially.

19. The mechanism to claim 18, further including a blocking plate (38), wherein the blocking plate (38) is positioned at the column (311) and blocked on a lateral side of the ball bearing (37).

20. The mechanism to claim 19, further including a screw post (39), wherein the column (311) is provided with a screw hole (310) correspondingly, the screw post (39) is inserted in the blocking plate (38) and combined in the screw hole (310).

21. The mechanism to claim 16, wherein the elastic pressing assembly (35, 35a) includes a torsion spring (351) sleeved on the braking worm shaft (34, 34a) and a knob (352), the torsion spring (351) has a fixed end (3511) fixed on the supporting set (32, 32a) and a free end (3512) spinning out from the braking worm shaft (34, 34a) by a push of the knob (352).

22. The mechanism to claim 21, wherein the torsion spring (351) and the knob (352) are disposed separately on two sides of one of the lugs (321).

23. The mechanism to claim 22, wherein the knob (352) is protruded with a toggle plate (3521), and the lug (321) is provided with a trough (3210) correspondingly, the toggle plate (3521) inserts in the trough (3210) and positioned on a side of the free end (3512).

24. The mechanism to claim 23, wherein the toggle plate (3521) is a curved piece, and the trough (3210) is formed in an arc shape.

25. The mechanism to claim 21, wherein the elastic pressing assembly (35, 35a) further includes a holder (354) and a fastener (355), the holder (354) is pressed against the fixed end (3511) of the torsion spring (351) and is combined with the supporting set (32, 32a) through the fastener (355).

26. The mechanism to claim 25, wherein the holder (354) has a position slot (3540), and the fixed end (3511) of the torsion spring (351) is inserted in the position slot (3540).

27. The mechanism to claim 16, wherein the elastic pressing assembly (35, 35a) further includes at least one supporter (353), the supporter (353) is sleeved in an end of the braking worm shaft (34, 34a) and combined at a side of the lug (321).

28. The mechanism to claim 16, further including a shell (70), wherein the shell (70) is sleeved on the supporting set (32, 32a).

29. The mechanism to claim 28, further including an overlay (71), wherein the overlay (71) seals the transferring set (31, 31*a*) and seals another side of the shell (70).

30. The mechanism to claim 16, wherein the elastic pressing assembly (35, 35*a*) includes a first pressing piece (351*a*) resisting against the braking worm shaft (34, 34*a*), a link (352*a*) connecting with the first pressing piece (351*a*), a compression spring (353*a*) and a second pressing piece (354*a*) sleeved on the link (352*a*) and a pull rod (355*a*) connecting with the second pressing piece (354*a*), the second pressing piece (354*a*) exerted by the pull rod (355*a*) is forced on the first pressing piece (351*a*) through the compression spring (353*a*).

31. The mechanism to claim 30, wherein the first pressing piece (351*a*) has formed with an arc surface (3510*a*), the arc surface (3510*a*) is abutted on a side of the braking worm shaft (34, 34*a*).

32. The mechanism to claim 30, wherein the second pressing piece (354*a*) is located at a middle of the compression spring (353*a*) correspondingly.

33. The mechanism to claim 30, wherein the second pressing piece (354*a*) has a clip slot (3540*a*), and one end of the pull rod (355*a*) is snapped in the clip slot (3540*a*).

* * * * *